United States Patent [19]

Buder et al.

[11] Patent Number: 4,678,726
[45] Date of Patent: Jul. 7, 1987

[54] MULTICELL ELECTRIC STORAGE BATTERY WITH COMBINED MEANS FOR WASTE-GAS DRYING AND FLAME-PROTECTION

[75] Inventors: Eckart Buder, Neustadt; Hans-Ulrich Metz, Bad Münder; Dieter Übermeier, Hanover, all of Fed. Rep. of Germany

[73] Assignee: Varta Batterie Aktiengesellschaft, Hanover, Fed. Rep. of Germany

[21] Appl. No.: 821,497

[22] Filed: Jan. 22, 1986

[30] Foreign Application Priority Data

Jan. 30, 1985 [DE] Fed. Rep. of Germany ....... 3503014

[51] Int. Cl.[4] ............................................. H01M 2/12
[52] U.S. Cl. .......................................... 429/88; 429/86
[58] Field of Search ...................... 429/88, 86, 53, 83, 429/87

[56] References Cited

U.S. PATENT DOCUMENTS

| | | | |
|---|---|---|---|
| 4,117,205 | 9/1978 | Kitai | 429/86 |
| 4,219,612 | 8/1980 | Tatlock | 429/86 |
| 4,400,450 | 8/1983 | Wagner | 429/86 |
| 4,447,508 | 5/1984 | Jensen | 429/86 X |
| 4,463,069 | 7/1984 | Greenlee | 429/86 |

*Primary Examiner*—Brian E. Hearn
*Assistant Examiner*—Stephen J. Kalafut
*Attorney, Agent, or Firm*—Weiser & Stapler

[57] ABSTRACT

In a multicell electric storage battery designed for central gas release, before being released into the open air the battery gases pass through a container positioned on the block casing in which the acid particles and moisture are separated from the gases as a consequence of the gases being repeatedly deflected by a series of walls placed in the path of the gases, which may be perforated if desired, and the dehumidified gases are then passed through a porous flame-protection frit. Flashback of a flame caused by external ignition of the gases is prevented by rapid burn-off of the gases in a flame extinguishing chamber preceding the frit.

20 Claims, 1 Drawing Figure

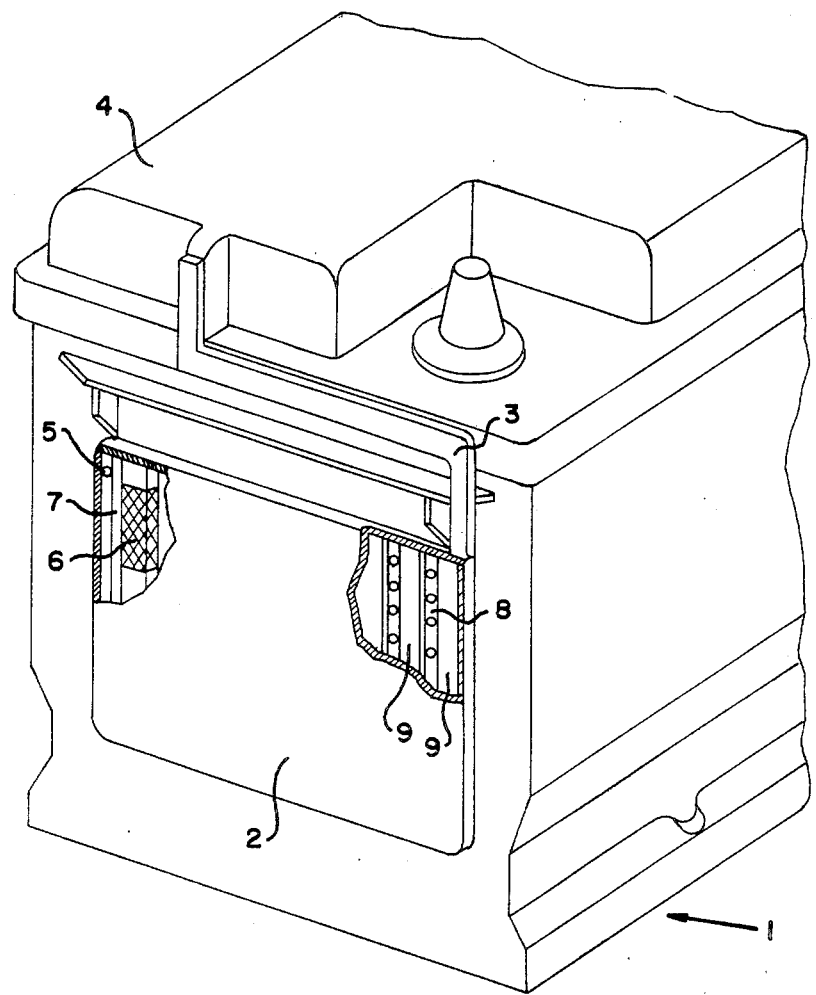

MULTICELL ELECTRIC STORAGE BATTERY WITH COMBINED MEANS FOR WASTE-GAS DRYING AND FLAME-PROTECTION

BACKGROUND OF THE INVENTION

The present invention relates generally to multicell electric storage batteries, especially block-type starter batteries having a common gas canal for releasing gases from the individual cells of the battery, through the block cover to the outside.

The operating circumstances of such batteries often prevent the free release of gases from the individual cells, either for safety reasons or simply because centralized gas removal to a defined location is desirable.

According to West German Registered Utility Model No. 8003 869, each cell of a six-cell battery is provided with a vent hole, and each vent hole has an individual, closed vent canal which extends within the cover of the block casing, parallel to the canals of the other cells. Each of the vent canals opens into a fine-pored filter, which is common to all cells. A gas-outlet chamber follows the filter to ventilate gases to the outside of the battery.

Such a gas-release system is suitable for the prevention of flashbacks and explosions of oxyhydrogen gases present in the battery due to ignition from outside influences, and also to prevent the propagation of flames from one cell of the battery to the next. However, such a gas-release system suffers from the disadvantage that the filter can become clogged by electrolyte particles originating from the gases released during overcharging.

DE-OS No. 23 58 417 shows yet another multicell storage battery having a "central gas-release system". In this battery, the individual gas spaces which are developed at the top of each of the cells are permitted to communicate with each other either through small openings provided in the cell partitions, above the electrolyte level, or via a central tube with small openings, which passes through the partitions. In either case, the space above the electrolyte level provides a gas-release chamber, and accumulated gases are removed to the outside either through a tube connection on the cover or through the central tube (which is open only at one end).

However, central gas-release, per se, is unable to prevent acid mist from being discharged along with the battery gases. Also to be considered is that a compact starter battery used in motor vehicles is made more inconvenient to handle if provided with a tube for carrying the acid mist to a less hazardous location. Moreover, the risk of oxyhydrogen-gas explosions resulting from sparks or flames generated in the vicinity of the battery are even greater at the central release point, because of the larger amounts of gas being discharged. Isolation of this point by flame-protection means, such as a frit, is already a known and practiced measure. However, the frit has the disadvantage that its pores also gradually become clogged by condensed moisture, so that unacceptably high pressures can eventually build up in the battery due to the blockage of the gas outlet.

SUMMARY OF THE INVENTION

The present invention therefore has as its primary object to provide a multicell storage battery with an improved central gas-release system.

It is also an object of the present invention to provide a central gas-release system which does not also permit the discharge of acid mist in connection with such gas release.

It is also an object of the present invention to provide a central gas-release system which effectively prevents flashbacks or explosions resulting from the ignition of released gases during charging of the battery, as well as the propagation of flames between the cells of the battery.

It is also an object of the present invention to provide a central gas-release system which effectively prevents the possibility of gas back-up within the battery.

It is also an object of the present invention to provide a central gas-release system having the foregoing capabilities which can be implemented without any appreciable space requirements, particularly in the external regions which surround the battery case, so that the battery can be used in its original placement without modification, e.g. without transfer to another holder.

These and other objects are achieved according to the present invention by providing a multicell electric storage battery with a central gas-release system for releasing gases from the several cells via a common gas canal which passes through the block cover to the outside, wherein the gas canal is followed by a container located on an outer side of the block casing and internally subdivided into at least two spaces in the direction of gas flow. A first space is provided with means for acid separation and collection, to remove moisture from the gases generated during overcharging. A second space is provided with flame-protection means and a flame-extinguishing chamber ahead of the gas outlet of the container.

For further detail regarding a preferred form of the present invention, reference is made to the following detailed description, taken in connection with the accompanying FIGURE which shows a partially sectioned, isometric view of a battery incorporating the gas-release system of the present invention.

DETAILED DESCRIPTION OF A PREFERRED EMBODIMENT

The FIGURE shows a starter battery 1 having a container 2 on one of its side walls. As is seen from the drawing, the contours of the block casing and thus the compactness of the battery are only minimally affected by the container 2, enabling the starter battery 1 to be used in its original placement, without modification.

Gases collected by conventional means under the cover 4 of the battery's block casing are received within the container 2 by means of a connecting canal 3, and are released through a gas outlet opening 5 after the gases have been subjected to drying and flame protection as follows.

The interior of the container 2 is subdivided into at least two spaces, which are in series with the direction of the flow of gases from the connecting canal 3 to the outlet opening 5. The first of the spaces provided contains means for acid separation and collection, for removing moisture from the discharged gases, while the second space accommodates flame-protection means 6, preferably followed by an additional flame-extinguishing chamber 7 ahead of the gas outlet 5.

Repeated deflection of the gas stream on a series of baffles has proven to be an efficient means of drying gases since due to their inertia, the entrained liquid drops are unable to follow sudden changes in direction, impacting on the baffles and eventually settling on the bottom of the container structure. Thus, as a means for removing moisture a series of walls 8, which are preferably perforated, are positioned crosswise to the gas stream in the first part of the container 2, so as to develop a series of chambers 9. The walls 8 can be replaced, or complemented according to the present invention, by a liquid collector, preferably a non-evaporating liquid having a viscosity which is not so excessively high as to prevent the gas from being able to easily bubble through it. Consequently, acid particles which are not entrained by the baffle plates which are traditionally provided in the cells of the battery are separated from the gases passing from the connecting canal 3 to the outlet opening 5, and are collected (and concentrated over time) within the first part of the container 2.

The gases, thus dehumidified, can then flow to the flame-protection means 6 which is located in the second part of the container 2, preferably a frit made from sintered porous plastic. As a consequence of the dehumidification taking place in the first part of the container 2, there is no risk of the pore system of the flame-protection means 6 from becoming wetted. Thus, the undesirable back-up of gases is effectively prevented.

As previously indicated, a flame-extinguishing chamber 7 is preferably located between the frit 6 and the gas outlet 5. Consequently, the flame-extinguishing chamber 7 serves to keep harmful external effects away from the frit. However, its actual function, for which both its volume and its gas-outlet opening are appropriately dimensioned, is to prevent flames from seeking to return to the battery as a consequence of the external ignition of gases evolving during charging of the battery. Instead, the gases are caused to promptly burn off. The formation of a steady flame at the outlet of the frit, and the associated risk of burning through the frit, is thus prevented. Consequently, the ignition is unable to propagate through to the connecting canal 3 and into the battery. The above-mentioned liquid collection means, because it is located in the path of the escaping gases, also acts as a flame barrier and thus still further ensures interruption of the flame even if the frit should fail.

It is especially favorable if the flame-protection device 6 is comprised of a frit in combination with a porous metal body which precedes the frit at its gas inlet. The porous metal body serves as a means for rapid heat dissipation, and can be a porous sintered material or a bed of metal particles such as metal chips introduced into the container 2. A metal foam, a metal mat or steel wool are also suitable. Each of these means may also be used in place of the frit, if desired, in the form of an appropriate molded body. The pore size of the metal body should preferably be selected such that any moisture still present in the gas is condensed due to surface adsorption, so that an additional gas-drying effect is also achieved.

Finally, the container 2 is also capable of accommodating in suitable manner, a gas sensor as disclosed in West German Patent Application No. P 34 14 664, provided the sensor is located where the gas flow has already been freed from acid particles and dehumidified. This gas sensor is a temperature-sensitive electronic unit, e.g. a commercial NTC or PTC resistor, whose surface is coated with a hydrogen recombination-catalyzing material, e.g. a PTFE-bound palladium/activated carbon mixture. The resistor responds to the temperature rise which is associated with the recombination of gases on the catalyst as the battery gases evolve, with a composition corresponding to the stoichiometric composition of oxyhydrogen gas at the end of the charging cycle. This change in resistance then produces an electrical signal to indicate the fully charged state, or to switch off the charging current.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. In a multicell electric battery comprised of a block casing and cover defining a plurality of individual cells which are capable of releasing gases via a common gas canal passing through the block cover of the battery to the outside, the improvement wherein the gas canal communicates with a container located on an outer side of the block casing of the battery, and wherein the container is internally subdivided into at least two spaces in the direction of gas flow including a first space containing means for acid separation and collection, for removing moisture from the gases generated during overcharging, and a second space provided with flame protection means.

2. The battery of claim 1 wherein the second space has a gas outlet, and wherein a flame-extinguishing means precedes the gas outlet.

3. The battery of claim 1 wherein the acid separation means is comprised of a plurality of walls placed crosswise in the gas stream, so as to cause deflection of the gas stream for acid separation.

4. The battery of claim 3 wherein the walls are perforated.

5. The battery of claim 3 wherein the acid collection means is a liquid collector in combination with the plurality of walls.

6. The battery of claim 1 wherein the acid separation and collection means is a liquid collector.

7. The battery of claim 1 wherein the flame protection means is a frit from sinter-porous plastic.

8. The battery of claim 1 wherein the flame protection means is a porous sintered metal body or a bed of metal particles.

9. The battery of claim 8 wherein the flame protection means precedes the gas inlet of a plastic frit, and wherein the pore size of the flame protection means is selected to achieve a gas-drying effect.

10. The battery of claim 1 wherein the flame protection means is formed of a metal foam.

11. The battery of claim 10 wherein the flame protection means precedes the gas inlet of a plastic frit, and wherein the pore size of the flame protection means is selected to achieve a gas-drying effect.

12. The battery of claim 1 wherein the flame protection means is formed of a metal mat.

13. The battery of claim 12 wherein the flame protection means precedes the gas inlet of a plastic frit, and wherein the pore size of the flame protection means is selected to achieve a gas-drying effect.

14. The battery of claim 1 wherein a gas sensor for detecting the fully charged state of the battery is positioned in the container at a location in the gas flow at which the acid particles have been separated from the gas.

15. The battery of claim 1 wherein the acid collected within the first space is not returned to the cells.

16. In a multicell electric battery comprised of a block casing and a cover defining a plurality of individual cells which are capable of releasing gases:
- a container located on an outer side wall of the block casing of the battery; and
- a common gas canal passing through the block cover of the battery and extending from the block cover and to the container;
- wherein the container is internally subdivided into at least two spaced in the direction of gas flow including a first space containing means for acid separation and collection, for dehumidifying the gases generated during over-charging, and a second space provided with flame protection means.

17. The battery of claim 16 wherein the acid separation means is comprised of a plurality of transverse walls placed crosswise in the gas stream, so as to cause deflection of the gas stream for acid separation.

18. The battery of claim 17 wherein the walls are perforated.

19. The battery of claim 17 wherein the acid collection means includes a liquid collector in combination with the plurality of walls, said liquid collector comprising a non-evaporating liquid having a viscosity which permits gases to bubble through the liquid.

20. The battery of claim 17 wherein the acid collected within the first space is not returned to the cells.

* * * * *